United States Patent
Shao et al.

(10) Patent No.: US 11,892,887 B2
(45) Date of Patent: Feb. 6, 2024

(54) METHODS, SYSTEMS, AND MEDIA FOR TRAFFIC MANAGEMENT IN SMART CITY BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yaqiang Quan, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/663,434

(22) Filed: May 16, 2022

(65) Prior Publication Data
US 2023/0367380 A1    Nov. 16, 2023

(51) Int. Cl.
*G06F 1/26* (2006.01)
*G08G 1/095* (2006.01)
*G08G 1/01* (2006.01)
*B64C 39/02* (2023.01)
*B64U 50/19* (2023.01)
*B64U 101/00* (2023.01)

(52) U.S. Cl.
CPC .............. *G06F 1/26* (2013.01); *B64C 39/024* (2013.01); *G08G 1/0133* (2013.01); *G08G 1/0145* (2013.01); *G08G 1/095* (2013.01); *B64U 50/19* (2023.01); *B64U 2101/00* (2023.01); *B64U 2201/10* (2023.01)

(58) Field of Classification Search
None
See application file for complete search history.

(56) References Cited

U.S. PATENT DOCUMENTS

| | | | |
|---|---|---|---|
| 2018/0122229 A1* | 5/2018 | Mubarek | G08B 21/18 |
| 2021/0046829 A1* | 2/2021 | Gaither | B60L 53/65 |
| 2022/0255223 A1* | 8/2022 | Tran | H04L 67/535 |
| 2022/0309917 A1* | 9/2022 | Anthonny Paulino | G08G 1/097 |

OTHER PUBLICATIONS

White Paper on Urban Brain Development, Smart City Standard Working Group of National Beacon Commission, 2022, 59 pages.
Shao, Zehua, Exploration and Research on the Structure of Internet of Things, Internet of Things Technologies Reliable Transmission, 2015, 10 pages.

(Continued)

*Primary Examiner* — Danny Chan
(74) *Attorney, Agent, or Firm* — METIS IP LLC

(57) ABSTRACT

The embodiments of the present disclosure provide a method, system, and medium for traffic management in a smart city based on Internet of Things (IoT). The method is implemented on the traffic management platform, comprising: obtaining power supply detection information of traffic indication device through a sensor network platform; predicting a congestion degree at a location of the traffic indication device in a target time period when the power supply detection information is in a power-off state; and determining whether a temporary power supply is needed to be provided to the traffic indication device based on the congestion degree.

5 Claims, 7 Drawing Sheets

(56) References Cited

OTHER PUBLICATIONS

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

* cited by examiner

700

```
┌─────────────────────────────────────────────────┐
│  Obtain the location information of the UAV, the location      │  ⟋ 710
│  information of each traffic indication device, and the         │
│  congestion degree of each traffic indication device            │
└─────────────────────────────────────────────────┘
                          │
                          ▼
┌─────────────────────────────────────────────────┐
│  Determine the power supply path for the UAV to supply         │  ⟋ 720
│  power to each traffic indication device based on the          │
│  location information of the UAV, the location information     │
│  of each traffic indication device, and the congestion degree  │
│  of each traffic indication device                             │
└─────────────────────────────────────────────────┘
                          │
                          ▼
┌─────────────────────────────────────────────────┐
│  Control the UAV to supply power to each traffic indication    │  ⟋ 730
│  device based on the power supply path                         │
└─────────────────────────────────────────────────┘
```

FIG. 7

METHODS, SYSTEMS, AND MEDIA FOR TRAFFIC MANAGEMENT IN SMART CITY BASED ON INTERNET OF THINGS

TECHNICAL FIELD

The present disclosure relates to the field of smart city, and in particular, to a method, system, and medium for traffic management in a smart city based on Internet of Things (IoT).

BACKGROUND

At present, the social economy is developing rapidly, the urban population is gradually increasing, and the urban transportation network is also increasingly developed. Urban traffic information systems have become an indispensable part of enhancing the life quality of residents. Urban traffic information systems can provide residents with traffic information through traffic indication devices, which are generally powered by the urban power supply. When there is a problem with urban power supply (such as circuit maintenance in some areas), it may lead to the failure of traffic indication devices, which may affect urban traffic.

Therefore, it is desirable to provide a method, system, and medium for traffic management in a smart city based on IoT to reduce the impact of traffic indication devices on urban traffic in case of power off through the IoT.

SUMMARY

According to an aspect of the present disclosure, a method for traffic management in a smart city based on Internet of Things (IoT) is provided. The method may be implemented in a traffic management platform. The method may include obtaining power supply detection information of traffic indication device through a sensor network platform; predicting a congestion degree at a location of the traffic indication device in a target time period when the power supply detection information is in a power-off state; and determining whether a temporary power supply is needed to be provided to the traffic indication device based on the congestion degree.

According to another aspect of the present disclosure, a system for traffic management in a smart city based on Internet of Things (IoT) is provided. The system may include a traffic management platform, a sensor network platform, and an object monitoring platform, the traffic management platform may be configured to perform the following operations: obtaining power supply detection information of traffic indication device through the sensor network platform; predicting a congestion degree at a location of the traffic indication device in a target time period when the power supply detection information is in a power-off state; and determining whether a temporary power supply is needed to be provided to the traffic indication device based on the congestion degree.

According to yet another aspect of the present disclosure, a computer-readable storage medium is provided. The medium may store computer instructions. When reading a computer instruction in the storage medium, the computer executing the method for traffic management in a smart city based on IoT described in any one of the foregoing.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a flowchart illustrating an exemplary process for determining a temporary power supply according to some embodiments of the present disclosure.

DETAILED DESCRIPTION

Figure 1:
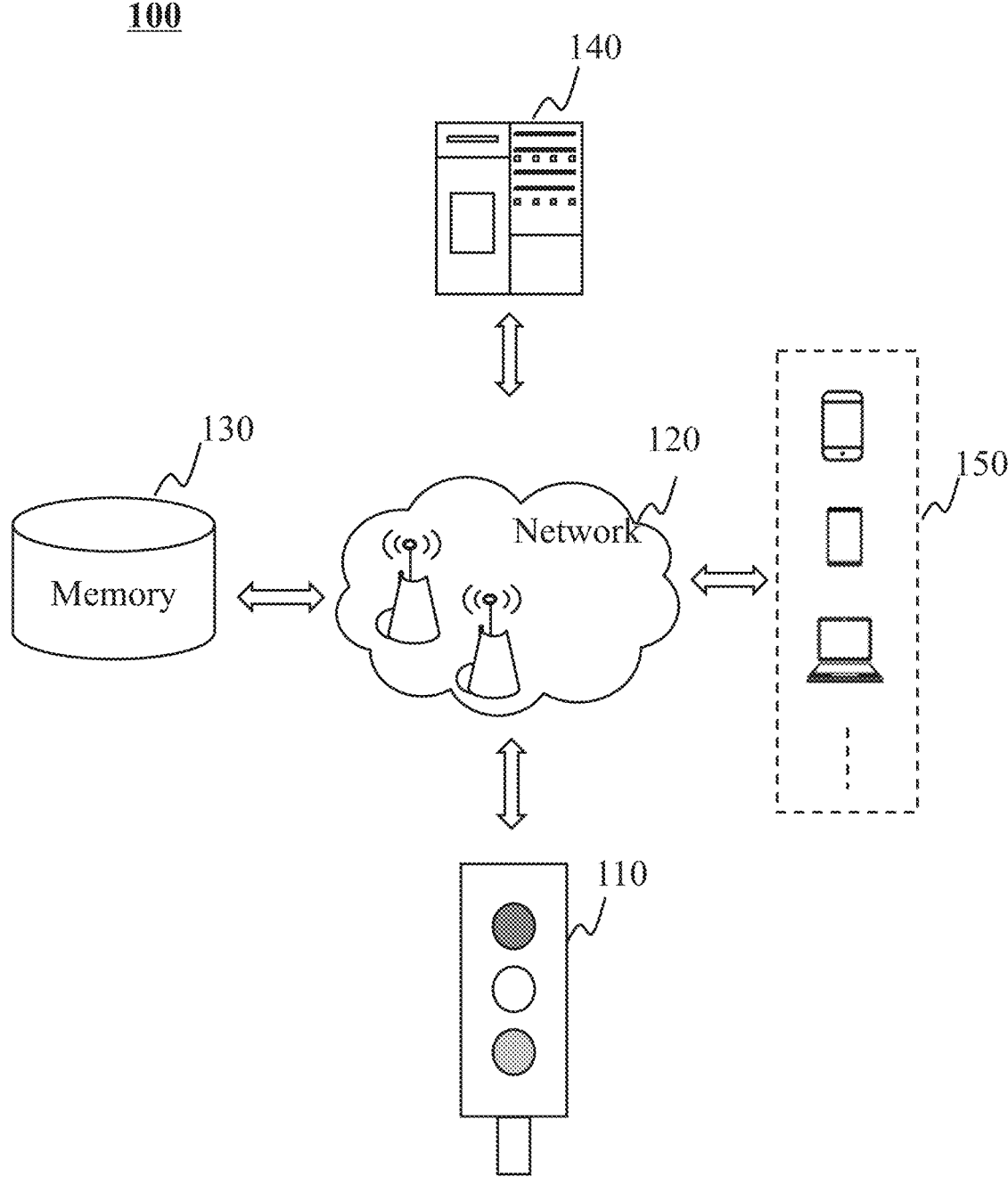
FIG. 1 is a schematic diagram illustrating an exemplary application scenario of a traffic management platform according to some embodiments of the present disclosure.

In order to more clearly explain the technical scheme of the embodiment of the present disclosure, the accompanying drawings required in the description of the embodiment will be briefly introduced below. Obviously, the drawings in the following description are only some examples or embodiments of the disclosure. For those skilled in the art, the resent disclosure can also be applied to other similar situations according to these drawings without paying creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts, or assemblies at different levels. However, if other words may achieve the same purpose, the words may be replaced by other expressions.

As shown in the present disclosure and claims, unless the context clearly prompts the exception, "a", "one", and/or "the" is not specifically singular, and the plural may be included. In general, the terms "comprises," "comprising," "includes," and/or "including" only indicate that the steps and units that have been clearly identified are included, the steps and units do not constitute an exclusive list, and the method or device may also include other steps or units.

The flowcharts are used in the present disclosure to illustrate the operations performed by the system according to the embodiment of the present disclosure. It should be understood that the foregoing or following operations may not be necessarily performed exactly in order. Instead, each operation may be processed in reverse or simultaneously. Moreover, other operations may also be added into these procedures, or one or more steps may be removed from these procedures.

FIG. 1 is a schematic diagram illustrating an exemplary application scenario of a traffic management platform according to some embodiments of the present disclosure;

As shown in FIG. 1, an application scenario of traffic management platform 100 may include a traffic indication device 110, a network 120, a memory 130, a processor 140, and a terminal 150.

By implementing the method and/or process disclosed in the present disclosure, the traffic management platform 100 may determine the congestion degree that may be caused by a power off at the intersection where each traffic indication device is located based on the power supply detection information of the traffic indication device at each intersection, and further determine whether a temporary power supply is needed to be provided to the traffic indication device.

The traffic indication device 110 refers to a device that may give action instructions to various vehicles and pedestrians passing on the road, such as a traffic light set at an intersection. In some embodiments, the traffic indication device may be provided with a power supply detection device (not shown), which may be configured to obtain the power supply detection information of the traffic indication device. In some embodiments, the traffic indication device 110 may also include an imaging device (not shown), for example, a camera, for acquiring road video to determine a congestion degree at an intersection. In some embodiments, the traffic indication device 110 may communicate, connect and exchange data with the memory 130, the processor 140, and the terminal 150 through the network 120.

The network 120 may include any suitable network that provides information and/or data exchange capable of facilitating the traffic management platform 100. Information and/or data may be exchanged between one or more components (e.g., the traffic indication device 110, the memory 130, the processor 140, the terminal 150) of the traffic management platform 100 through network 120. For example, the network 120 may send power supply detection information of a traffic indication device obtained by the object monitoring platform to the traffic management platform. In some embodiments, the network 120 may be any one or more of a wired network or a wireless network. In some embodiments, the network 120 may include one or more network access points. For example, the network 120 may include a wired or wireless network access point. In some embodiments, the network may be a variety of topologies such as point-to-point, shared, central, or a combination of various topologies.

The memory 130 may be configured to store data, instructions, and/or any other information. In some embodiments, the memory 130 may store data and/or information obtained from, for example, the traffic indication device 110, the processor 140, or the like. For example, the memory 130 may store road video, power supply detection information, or the like. In some embodiments, the memory 130 may be set in the processor 140. In some embodiments, the memory 130 may include a mass memory, a removable memory, or the like, or any combination thereof.

The processor 140 may process data and/or information obtained from other devices or various components of the traffic management platform 100. In some embodiments, the processor 140 may connect the traffic indication device 110, the memory 130, and the terminal 150 directly or through the network 120 to access information and/or data. For example, the processor 140 may obtain power supply detection information from the traffic indication device 110 and/or the memory 130. In some embodiments, the processor 140 may process data and/or information obtained from the traffic indication device 110. For example, the processor 140 may determine a count of the vehicles passing through the intersection (also referred to intersection traffic volume) based on the road video obtained from the traffic indication device 110. In some embodiments, the processor 140 may be a single server or a server group. The processor 140 may be local and/or remote. The processor 140 may be implemented on a cloud platform.

The terminal 150 refers to one or more terminal devices or software used by a user. In some embodiments, the terminal 150 may be a mobile device, a tablet computer, a notebook computer, or any combination thereof. In some embodiments, the terminal 150 may interact with other components in the traffic management platform 100 through the network 120. For example, the terminal 150 may receive the road congestion degree and detour information sent by the traffic management platform 100. In some embodiments, the terminal 150 may be a terminal device or software used by rescuers.

The Internet of things system is an information processing system that includes some or all of a management platform, a sensor network platform, and an object platform. Among them, the management platform may realize the overall planning and coordination of the contact and cooperation between functional platforms (such as a sensor network platform and/or an object platform). The management platform gathers information about the operating system of the Internet of Things and may provide the perception management and control management functions for the operating system of the Internet of Things. The sensor network platform may realize the connection of a management platform and an object platform, and plays the functions of sensing information sensor communication and controlling information sensor communication. The object platform is a functional platform for generating perceived information and executing control information.

The information processing in the Internet of Things system may be divided into the processing flow of perception information and the processing flow of control information. The control information may be the information generated based on perception information. Among them, the processing of perceived information may be to obtain perception information by the object platform and may transmit it through the sensor network platform to the management platform. The control information may be sent by the management platform to the object platform through the sensor network platform and may implement control of the corresponding object.

In some embodiments, when the Internet of Things system is applied to urban management, it may be called a smart city Internet of things system.

Figure 2:
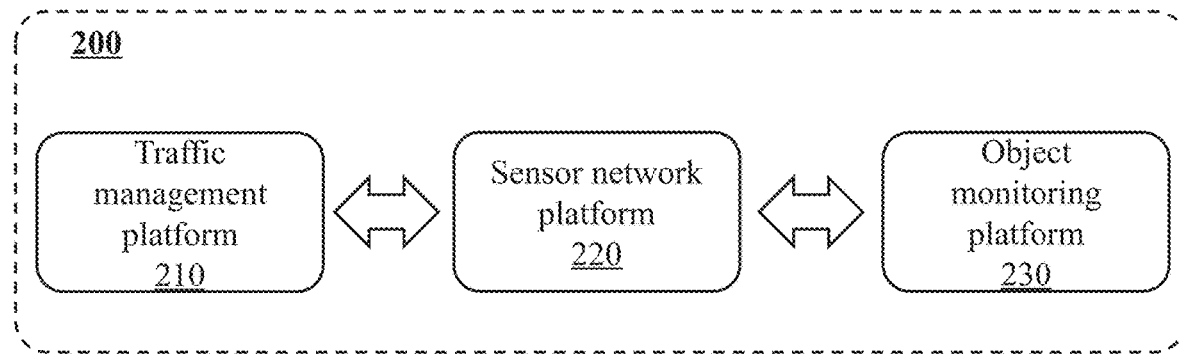
FIG. 2 is a schematic diagram illustrating an exemplary smart city traffic management system according to some embodiments of the present disclosure

FIG. 2 is a schematic diagram illustrating an exemplary smart city traffic management system according to some embodiments of the present disclosure. As shown in FIG. 2, the smart city traffic management system 200 may be implemented based on the Internet of things system. The smart city traffic management system 200 includes a traffic management platform 210, a sensor network platform 220, and an object monitoring platform 230. In some embodiments, the smart city traffic management system 200 may be part of the processor 140 or implemented by the processor 140.

In some embodiments, the smart city traffic management system 200 may be applied to a variety of scenarios of traffic management. In some embodiments, the smart city traffic management system 200 may respectively obtain the power supply detection information of the traffic indication device in various scenarios to obtain the traffic management strategy in each scenario.

Various scenes of traffic management may include, for example, a passing scene, a parking scene, a detour scene, or the like. It should be noted that the above scenarios are only examples and do not limit the specific application scenarios of the smart city traffic management system 200. Those skilled in the art may apply the smart city traffic management system 200 to any other suitable scenario on the basis of the contents disclosed in the embodiment.

In some embodiments, the smart city traffic management system 200 may be applied to road operation management. When the smart city traffic management system 200 is applied to road operation management, the object monitoring platform 230 may be configured to collect the power supply detection information of a traffic indication device, such as whether the traffic indication device is in a power-off state. The object monitoring platform 230 may upload the collected power supply detection information of a traffic indication device to the sensor network platform 220. The sensor network platform 220 may summarize and process the collected data. For example, the sensor network platform 220 may classify the collected data by region, device model, service life, or the like. The sensor network platform 220 then may upload the further summarized data to the traffic management platform 210. Based on the processing of the collected data, the traffic management platform 210 may make strategies or instructions related to the traffic management in the area where the traffic indication device in a power-off state is located, such as power supply instructions of the traffic indication device, issuance of detour prompt information, or the like.

The smart city traffic management system 200 may be described in detail below by taking the application of smart city traffic management system 200 to a power supply prediction management scenario as an example.

The traffic management platform 210 refers to a platform for traffic management in a city. In some embodiments, the traffic management platform 210 may belong to a management platform. The traffic management platform 210 may be configured to obtain power supply detection information of a traffic indication device through the sensor network platform 220; predict a congestion degree at a location of the traffic indication device in a target time period when the power supply detection information is in a power-off state; and determine whether a temporary power supply is needed to be provided to the traffic indication device based on the congestion degree.

In some embodiments, the traffic management platform 210 may also obtain location information of a traffic indication device; determine the congestion degree at the location of the traffic indication device in the target time period by processing, based on a prediction model, the location information. In some embodiments, the location information includes at least one of a type of a road at the location of the traffic indication device, a surrounding environment of the road, or a road network information within a preset range.

The sensor network platform 220 refers to a platform for unified management of information communication. In some embodiments, the sensor network platform may connect a traffic management platform and an object monitoring platform to realize the functions of power supply detection information communication and control information sensor communication.

The object monitoring platform 230 refers to a platform that obtains the power supply detection information of a traffic indication device detected by a power supply detection device.

Figure 3:
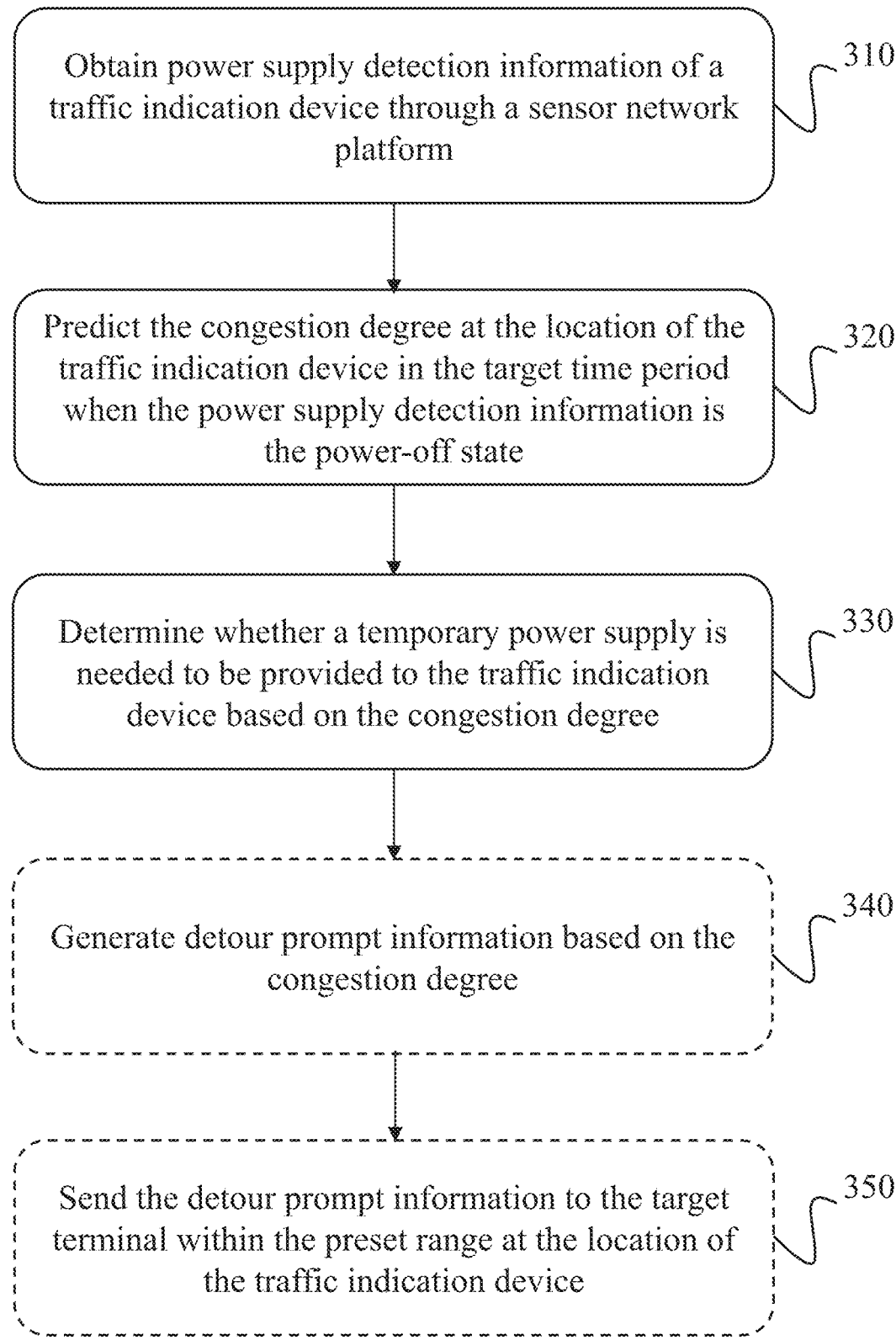
FIG. 3 is a flowchart illustrating an exemplary method for traffic management according to some embodiments of the present disclosure.

FIG. 3 is a flowchart illustrating an exemplary method for traffic management according to some embodiments of the present disclosure. In some embodiments, process 300 may be performed by the traffic management platform 210. As shown in FIG. 3, the process 300 may include the following processes:

In 310, obtain power supply detection information of a traffic indication device through a sensor network platform.

The traffic indication device may be configured to generate a traffic indication signal, which may be used to prompt traffic rules of the current road segment for vehicles and pedestrians. For example, a traffic indication device may be set in all directions of the road intersection. When passing through the intersection, the current traffic rules of the road intersection may be determined by the lights of the traffic indication device and the lights of other signs. In some embodiments, the traffic indication device may also include other indication devices for providing traffic assistance information. For example, the traffic indication device may also include an LED display board for displaying road conditions.

In some embodiments, a traffic management platform may communicate with other Internet of things platforms and related devices of the smart city traffic management system through a sensor network platform (such as the sensor network platform 220). For example, the traffic management platform may communicate with a traffic indication device through a sensor network platform (such as the sensor network platform 220). The traffic management platform may obtain power supply condition of the traffic indication device through the sensor network platform and control the traffic indication signal of each traffic indication device to control the traffic situation in a city.

The power supply detection information may include the power supply condition of the traffic indication device, wherein the power supply condition of the traffic indication device may include a power-off state. When the traffic indication device is in a power-off state, the traffic indication device cannot generate traffic indication signals. For example, when the power supply system of the traffic indication device is powered off, the traffic indication device is in a power-off state. For another example, when the traffic indication device is powered by an external battery and the external battery energy is exhausted, the traffic indication device is in a power-off state.

In some embodiments, the power supply condition of the traffic indication device may also include a power supply state and a temporary power supply state. When the traffic indication device is in a power supply state, the internal power supply circuit of the traffic indication device may supply power for the traffic indication device, and the traffic indication device may work normally. The internal power supply circuit may be connected with a smart city power supply system such as an urban power supply network and a power supply network of a surrounding community. When the traffic indication device is in a temporary power supply state, the external power supply circuit of the traffic indication device may supply power for the traffic indication device, and the traffic indication device may work normally. Among them, the external power supply circuit may be connected with the external power source, which may include a lithium battery, a solar battery, a storage battery, and other devices.

In some embodiments, the power supply detection information may be determined by determining the power supply condition of the traffic indication device. In some embodiments, the power supply condition of the traffic indication device may be determined by the power supply condition of the power supply network where the traffic indication device is located. For example, the traffic indication device may be connected with the urban power supply network and powered by the urban power supply network. When part of the urban power supply network is powered off, the corresponding power-off area may be determined according to the part of the power supply network. Then the traffic indication device in the power-off state may be determined according to the power-off area to generate power supply detection information. Among them, the power supply detection information may include a traffic indication device in a power-off state.

In some embodiments, the power supply condition of the traffic indication device may be detected by a power supply detection device. The power supply detection device may send the detected power supply condition of the traffic indication device to the object monitoring platform, and the object monitoring platform determines the power supply detection information, that is, the power supply detection information of the traffic indication device detected by the power supply detection device may be obtained through the object monitoring platform.

The object monitoring platform (e.g., the object monitoring platform 230) may communicate with the power supply detection device and may be configured to monitor the power supply condition of at least one traffic indication device. In some embodiments, the object monitoring platform may be set in each road area of a city to monitor the power supply condition of each traffic indication device in the road area. Among them, when the power supply detection device of each traffic indication device sends the power supply condition to the object monitoring platform, the object monitoring platform may generate power supply detection information according to the power supply condition of each traffic indication device in the road area. In some embodiments, the object monitoring platform may send the obtained power supply detection information to the traffic management platform (e.g., the traffic management platform 210) through the sensor network platform (e.g., the sensor network platform 220). That is, the traffic management platform may access the object monitoring platform through the sensor network platform, and obtain the power supply detection information of the traffic indication device detected by the power supply detection device from the object monitoring platform.

The power supply detection device may be configured to detect the power supply condition of the traffic indication device. Among them, the power supply detection device may generate signals according to the power supply condition of the traffic indication device and send them to the object monitoring platform. In some embodiments, the power supply detection device may be provided with an internal power supply, and the working condition of the power supply detection device may be not affected by the power supply condition of the traffic indication device.

In some embodiments, the power supply detection device may be disposed on the traffic indication device and connected with the power supply circuit of the traffic indication device. The power supply detection device may generate a signal according to the voltage change of the power supply circuit. Among them, the representation of the signal may be determined according to the actual needs. For example, when the traffic indication device is in the power-off state, the voltage of the power supply circuit becomes 0, and the power supply detection device may generate a pulse signal in response to a change in the voltage of the power supply circuit and send it to the object monitoring platform.

In some embodiments, after receiving the signal, the object monitoring platform may determine the traffic indication device according to the connection relationship with the power supply detection device (e.g., the port receiving the signal), and determine the power supply condition of the traffic indication device according to the type of signal. Exemplarily, when the object monitoring platform receives the pulse signal, the object monitoring platform may judge that the traffic indication device from which the pulse signal is transmitted is in the power-off state.

In 320, predict the congestion degree of the location of the traffic indication device in the target time period when the power supply detection information is the power-off state.

The power supply detection information is the power-off state, which may indicate that the traffic indication device is in the power-off state. For example, when the traffic indication device is suddenly powered off, the object monitoring platform may receive the signal sent by the power supply detection device, so as to generate power supply detection information indicating that the traffic indication device is already in a power-off state.

In some embodiments, the power supply detection information may also include the future power supply condition of the traffic indication device. For example, the future power-off area may be determined by the power-off plan (such as circuit maintenance plan) of relevant power supply departments, and then the power supply condition of each traffic indication device in the future may be determined by the power-off area and the location of traffic indication device. For another example, when the traffic indication device is powered by an external power source, the power depletion time may be determined by the power of the external power source so as to determine the time when the traffic indication device may be in a power-off state.

The location of the traffic indication device refers to the intersection where the traffic indication device is located. In some embodiments, the location of the traffic indication device may include various directions of the intersection where the traffic indication device is located. For example, when the traffic indication device is located at an intersection, the location of the traffic indication device may include four directions of the intersection.

The target time period may be a period of time after the traffic indication device begins to be in a power-off state. For example, the target time period may be one hour after the traffic indication device is in a power-off state. For another example, the target time period may be the estimated power-off time of the traffic indication device, exemplarily the estimated power-off time may be determined by the power-off notice of the relevant power supply department. As another example, the target time period may be a special time period after the traffic indication device is in a power-off state. For example, the target time period may be the peak time (such as morning peak, evening peak, etc.) of traffic after power off.

The congestion degree may be used to describe the degree of traffic congestion caused by power off of traffic indication devices at an intersection. Among them, traffic congestion refers to the traffic phenomenon that vehicles are forced to reduce their speed or stop, and the vehicle backlog exceeds a certain degree since the traffic demand of vehicles is affected by traffic events (such as power off of traffic indication devices). In some embodiments, the congestion degree may be described by a congestion level. For example, the congestion level may include congestion level I, congestion level II, congestion level III and congestion level IV. Among them, congestion level I may indicate serious congestion, congestion level II may indicate moderate congestion, congestion level III may indicate mild congestion, and congestion level IV may indicate smooth traffic.

In some embodiments, the congestion degree may be determined by the traffic congestion index. For example, when the traffic congestion index meets the preset conditions, it is judged that the congestion degree is at the corresponding congestion level. For example, the traffic congestion index may include the average delay per vehicle at an intersection. When the average delay per vehicle at an intersection is less than 35 seconds, the congestion level of the intersection is congestion level IV; When the average delay per vehicle at an intersection is more than 35 seconds and less than 50 seconds, the congestion level of the intersection is congestion level III; When the average delay per vehicle at an intersection is more than 50 seconds and less than 70 seconds, the congestion level of the intersection is congestion level II; When the average delay per vehicle at an intersection is more than 70 seconds, the congestion level of the intersection is congestion level I.

In some embodiments, the traffic congestion index may include at least one of the average delay per vehicle at an intersection, a queue length, a queue time at the intersection, a queue overflow, and a queue time index. Among them, the queue length refers to the length of the vehicle queue from the stop line of the intersection or the starting point of the queue to the end of the queue. The queue time at the intersection refers to the time it takes queuing vehicles at an intersection to start parking for the first time until they pass through the stop line of the entrance lane. The queuing time index refers to the ratio of vehicle queuing time at intersections controlled by the signal and signal control cycle. The queue overflow refers to the traffic phenomenon that a vehicle queue at the downstream intersection spreads to the upstream intersection.

In some embodiments, the congestion degree of the intersection may be calculated by collecting data from the intersection where the traffic indication device is in the power-off state. For example, the average delay time per vehicle in each entrance lane within a certain time interval at the intersection may be collected to determine the maximum average delay per vehicle at the intersection. In some embodiments, the data acquisition method, acquisition time, and congestion degree calculation method may be determined according to relevant national standards. For example, the relevant provisions of the "Road Traffic Congestion Evaluation Method" (GA/T 115-2020), "Urban Traffic Health Evaluation Specification" (GB/T 33171-2016) may be referred to.

In some embodiments, the congestion degree at the location of the traffic indication device may be estimated in accordance with the historical traffic data at the location (such as the intersection) of the traffic indication device in the power-off state and/or the real-time traffic data of the relevant intersection. For example, the traffic data at the location of the traffic indication device in the power-off state may be estimated according to the real-time traffic data (such as traffic volume data) of the non-power-off intersection adjacent to the traffic indication device, and then the congestion degree at the location of the traffic indication device may be determined based on the estimated traffic data.

In some embodiments, the congestion degree at the location of the traffic indication device in the target time period may be predicted by the machine learning method, that is, the congestion degree may be predicted based on the prediction model. The specific content of the prediction model may be described with reference to FIG. 5.

In 330, determine whether a temporary power supply is needed to be provided to the traffic indication device based on the congestion degree. Temporary power supply refers to the power supply of a traffic indication device through an external power source. For example, the external power source may be connected with the power supply circuit of the traffic indication device to supply power to the traffic indication device through a temporary power supply device. The temporary power supply device may include the external power source. Exemplarily, the external power source may include a generator, a storage battery, or the like.

In some embodiments, the temporary power supply device may also include setting an alternative traffic indication device (such as a solar traffic indication device, a traffic indication device with a built-in power supply, or the like) at an intersection in a power-off state.

In some embodiments, when the congestion degree meets the preset condition, it may be determined that a temporary power supply is needed to be provided to the traffic indication device, otherwise, the temporary power supply is not needed to be provided. In some embodiments, the preset condition may be a preset threshold. When the congestion degree is greater than the preset threshold, it may be determined that a temporary power supply is needed to be provided to the traffic indication device, otherwise, the temporary power supply is not needed to be provided. For example, the preset condition may include that the congestion level of the intersection is congestion level I.

Figure 4:
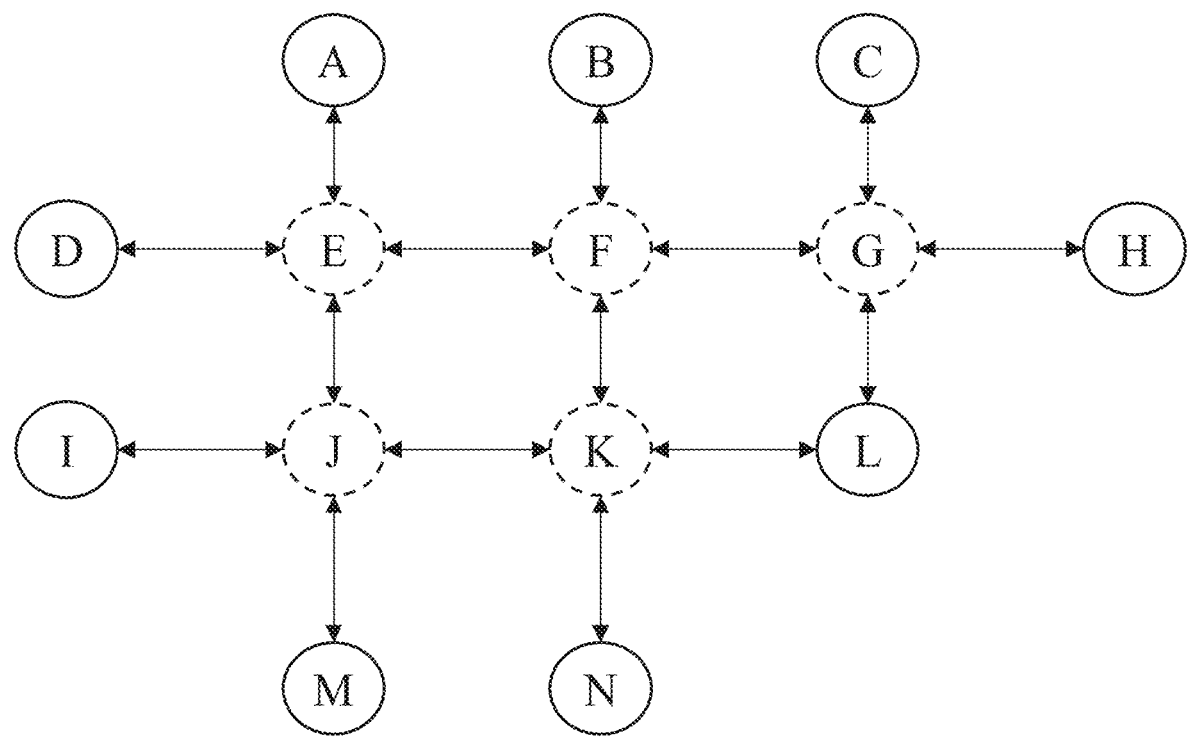
FIG. 4 is a schematic diagram illustrating an exemplary traffic network according to some embodiments of the present disclosure.

In some embodiments, the power supply state of each road network node in the traffic network may be determined according to the power supply state of the traffic indication device. For example, the power supply state of each traffic indication device may be determined according to the power supply detection information obtained in step 310, and then the power supply state of each road network node may be determined. As shown in FIG. 4, the traffic network may be composed of road network nodes (intersections). The road network nodes in FIG. 4 may include nodes A~N (also known as intersections A~N) and the connection relationship between nodes. Among them, nodes may represent intersections in the traffic network, and the connection relationship between nodes may represent that there is a traffic road between intersections. The traffic road may be characterized as two intersections located on the same road or the distance therebetween is less than the threshold. For example, the road from intersection D to intersection E may be recorded as road DE. When the traffic indication devices at nodes E, F, G, J, and K are in a power-off state, it may be determined that nodes E, F, G, J, and K may be the intersection in the power-off state (the intersection where the associated traffic indication device in the power-off state is located), which is depicted by a dotted line in FIG. 4.

In some embodiments, when implementing the traffic management method provided in some embodiments of the present disclosure, the adjacent intersections of the intersection in the power-off state may be also considered. For example, the congestion index of an intersection in a power-off state may be determined according to the adjacent intersections. In some embodiments, an adjacent intersection may be an intersection where traffic conditions are affected by a traffic indication device in a power-off state. For example, the adjacent intersection may be the intersection where the traffic indication device around the traffic indication device in the power-off state is located, that is, according to the intersection where the traffic indication device in the power-off state is located, the intersection on the same road with above intersection or the intersection whose distance is less than the threshold may be determined as the adjacent intersection. Exemplarily, the node adjacent to the intersection may be regarded as the adjacent intersection according to the positions of nodes E, F, G, J, and K, that is, nodes A, B, C, D, H, I, L, M and N represent the adjacent intersections of the intersection in the power-off state.

In some embodiments, a manner of the temporary power supply includes supplying power to the traffic indication device through a battery carried by an unmanned aerial vehicle (UAV). For the specific content of the power supply through the external power source carried by the UAV, refer to FIG. 7 of the disclosure and its related contents.

According to the traffic management method provided in some embodiments of the disclosure, the power-off state of the traffic indication device may be obtained in time, and the power supply may be provided according to the congestion degree of the traffic indication device, and then the timely maintenance of traffic conditions is realized so that the traffic indication device in the power-off state may not affect the normal traffic of the traffic network, so as to avoid the further impact (such as increasing the congestion degree, increasing queuing time at intersections, etc.) of the traffic indication device in the power-off state.

In some embodiments, the processor 140 may also adjust the signal strategy of the relevant traffic indication device in response to the traffic indication device in the power-off state and its congestion condition. The relevant traffic indication device may be an adjacent traffic indication device to a traffic indication device in a power-off state. For example, the relevant traffic indication device may be a traffic indication device within 5 km around the traffic indication device in the power-off state. The signal strategy may include the duration of each traffic control information signal of the traffic indication device. Exemplarily, in the traffic network shown in FIG. 4, the signal strategy of the traffic indication devices at nodes C and L may be controlled based on the power-off state of node G. For example, the time interval between the green light in the direction of road CG at node C and the green light at node L may be determined according to the congestion condition of node G. Exemplarily, the time interval between the green light in the direction of road CG and the green light at node L may be determined according to the length of road CL, the maximum average delay time per vehicle at node G, and the average vehicle speed at node G. And then the minimum time interval between the green light in the direction of road CG and the green light at node L may be determined according to the signal cycle, and the signal strategy at nodes C and L may be controlled based on this time interval.

As shown in FIG. 3, the traffic management methods provided in some embodiments of the present disclosure may further include a step of generating a detour prompt information to remind the user to detour the power-off area.

In 340, generate detour prompt information based on the congestion degree. In some embodiments, step 340 may be performed by the traffic management platform 210.

The target terminal refers to the device where the driver receives the detour prompt information. For example, the target terminal may be a mobile terminal. For example, the target terminal may include a driver's intelligent terminal, a vehicle navigation device, or the like. In some embodiments, the target terminal may also include a related indication device for providing traffic assistance information. For example, the target terminal may include an LED display device of an intersection.

In some embodiments, a target terminal within a preset range may be determined according to the terminal location. For example, the traffic management platform may obtain the terminal location of each terminal connected with the traffic management platform, determine the terminal(s) within the preset range as the target terminal according to the terminal location(s), and send detour prompt information to the target terminal.

In some embodiments, when the traffic management platform determines the target terminal, the detour prompt information may be sent to the target terminal through the sensor network platform. For example, the traffic management platform may determine the device ID of the target terminal, and then send the detour prompt information to the port corresponding to the device ID through the sensor network platform.

According to the traffic management method provided in some embodiments of this disclosure, the detour prompt information may be generated in time and sent to the target terminal, so as to accelerate the transmission of relevant information that the traffic indication device is in the power-off state and reduce the traffic burden of relevant intersections.

It should be noted that the above description of process 300 is only merely for example and description, without limiting the scope of the present disclosure. Process 300 may be made various corrections and changes may be made under the guidance of the present disclosure. However, these corrections and changes are still within the scope of the present disclosure. For example, according to the duration of the external power source, the time when the traffic indication device is in the power-off state after the power of the external power source is exhausted may be estimated, and the power supply detection information may be generated to repeat the traffic management method provided in the present disclosure.

Figure 5:
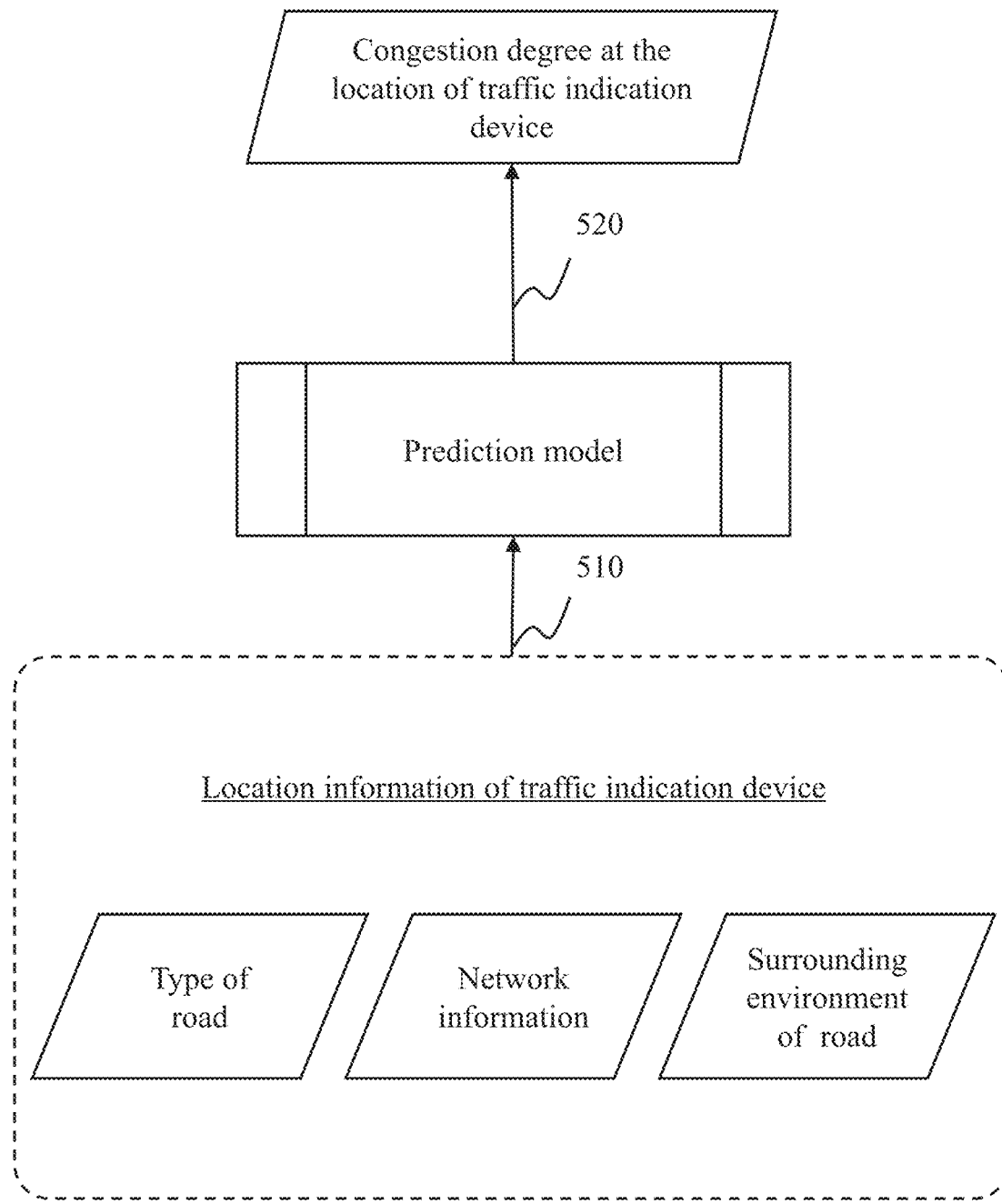
FIG. 5 is a schematic diagram illustrating an exemplary method for determining the congestion degree according to some embodiments of the present disclosure.

FIG. 5 is a schematic diagram illustrating an exemplary method for determining the congestion degree according to some embodiments of the present disclosure;

In 510, obtain the location information of the traffic indication device. In some embodiments, 510 may be performed by the object monitoring platform 230.

The location information may be information related to the location of the traffic indication device. In some embodiments, the traffic indication device may be a traffic indication device in a power-off state.

In some embodiments, when the object monitoring platform 230 determines the traffic indication device in the power-off state, the object monitoring platform 230 may automatically detect the location information of the traffic indication device, write the location information of the traffic indication device into the power supply detection information of the traffic indication device, and send it to the traffic management platform 210 through the sensor network platform 220.

In some embodiments, the location information may include at least one of a type of a road (also referred to as road type) at the location of the traffic indication device, a surrounding environment of the road, or a road network information within a preset range. For example, road types may include motorways, class I highways, class II highways, class III highways, class IV highways, expressways, trunk roads, secondary trunk roads, branches, laneways, factory and mine roads, forest roads, rural roads, etc., or any combination thereof. The surrounding environment of the road may include whether the road where the traffic indication device is in a power-off state includes some special sections. In some embodiments, special sections may include school sections, accident-prone sections, park sections, tourism sections, or the like. In some embodiments, the location information may also include monitoring information of the location. For example, a surveillance video at the location of the traffic indication device.

The road network information within the preset range may be the road network data structure with different functions, grades, and locations within the preset range. The road network information within the preset range may include the road network information in a range formed by connecting the intersections where a plurality of traffic indication devices in the power-off state are located. As shown in FIG. 4, the traffic indication devices at intersections E, F, G, J and K are in the power-off state, and the road network information within the preset range may be the road network information in a range formed by connecting intersections E, F, G, J and K. The road network information within the preset range may also include the road network information of a range formed by connecting the intersections where the traffic indication devices in the power-off state are located extend outward by one intersection. As shown in FIG. 4, when the traffic indication devices at intersections E, F, G, J and K are in the power-off state, the road network information within the preset range may also be the road network information in a range formed by connecting intersections A-N.

In some embodiments, the preset range may be obtained by amplifying the area composed of the traffic indication device in the power-off state, and the magnification may be different. In some embodiments, the preset range may also be a range within the preset threshold of the traffic indication device in the power-off state. In some embodiments, the preset threshold may be different.

In 520, process the location information based on the prediction model to determine the congestion degree at the location of the traffic indication device in the target time period. In some embodiments, the congestion degree at the location of the traffic indication device in the target time period may be determined by the prediction model. The prediction model may be configured to predict the congestion degree in the target time period based on location information.

In some embodiments, the prediction model may be a Deep Neural Networks (DNN) model. Correspondingly, the input of the prediction model may be the location information of the traffic indication device, and the output of the prediction model may be the congestion degree at the location of the traffic indication device in the power-off state.

The prediction model may be trained based on the historical location information of the traffic indication device in the power-off state and the corresponding historical congestion degree. Exemplarily, the training sample may be the historical location information at multiple sample time points, and the label of the training sample is the historical congestion degree of the intersection where the traffic indication device in the power-off state is located in the historical target time period. Among them, the historical location information at multiple sample time points refers to the location of the traffic indication device in the power-off state in the historical data of the urban traffic network. The historical congestion degree in the historical target time period may be the congestion degree at the location of the traffic indication device in the power-off time period. The historical congestion degree in the target time period may be manually marked by the user or determined according to the historical prediction results. In the training process, the samples may be input into the initial prediction model, and the model output results and sample labels may be input into the loss function. A parameter of the initial prediction model may be updated iteratively based on the loss function until the preset condition is met and the trained prediction model is obtained. The preset condition may be that the loss function is less than the threshold, convergence, or the training cycle reaches the threshold.

Some embodiments of the present disclosure may determine the congestion degree of the intersection where the traffic indication device in the power-off state is located based on the prediction model, which may better reflect the nonlinear relationship between the location information of the traffic indication device and the congestion degree of the intersection, so as to improve the prediction accuracy of the congestion degree of the intersection.

In some embodiments, the prediction model may be a Graph Neural Network (GNN). Correspondingly, the input to the prediction model may be graph data in a graph-theoretic sense, and the output may be the predicted value of the congestion degree of at least one node in the graph data.

The graph data may be a data structure composed of nodes and edges/paths. The graph data may include a plurality of nodes and a plurality of edges/paths connecting a plurality of nodes, so as to describe the characteristics of a plurality of traffic indication devices and the characteristics of roads between a plurality of traffic indication devices. The node in the graph data corresponds to the location (such as an intersection) of the traffic indication device. The edge may correspond to the road between the locations of two traffic indication devices.

Combined with the traffic network shown in FIG. 4, when the traffic indication devices of intersections E, F, G, J, and K are in the power-off state, the input graph data may include the characteristics of intersections E, F, G, J, and K and the characteristics of roads between intersections.

In some embodiments, the graph data input into the prediction model may be generated according to each traffic indication device and its location information in the road network information within the preset range. As the traffic network shown in FIG. 4, when the road network information within the preset range can also be the road network information of the range formed by connecting A~N, the input graph data may include the characteristics of intersections A~N and the characteristics of the roads between A~N, wherein the intersections may correspond to the nodes in the graph data, and the roads between intersections may correspond to the edges in the graph data.

In some embodiments, the output of the prediction model may be the predicted value of the congestion degree at the location of the traffic indication device in the power-off state in the graph data. As the traffic network shown in FIG. 4, when the input graph data is the graph data formed by intersections A-N, and the traffic indication devices at intersections E, F, G, J, and K in the graph data are in the power-off state, the prediction model may output the predicted value of the congestion degrees of intersections E, F, G, J, and K. In some embodiments, the output of the prediction model may also be the predicted value of the congestion degree at the location of the traffic indication device of each node in the graph data.

The characteristic of the location of the traffic indication device may be described by the characteristic of the node. The characteristics of the node may include a count of the vehicles passing through the intersection, that is, it may include the number of vehicles passing through the node and another node. Exemplarily, the characteristics of node E may include the traffic volume of EA, DE, EF and EJ. The correlation relationship of nodes may include the proximity relationship and location relationship of two nodes. For example, edge DE may represent that node D is adjacent to node E, and the length of edge DE may describe the distance from node D to node E. For the specific content of the traffic volume, refer to the relevant description in FIG. 6.

The characteristics of the road between the traffic indication devices may be described by the characteristics of the edge. The characteristics of the edge may include the length of the road, the intersection at both ends of the road, and other relevant information. As traffic network shown in FIG. 4, the characteristics of road DE may include intersections at both ends of the road (intersection D, intersection E), road direction (road DE represents the road from node D to node E), and road length.

The graph neural network is a kind of neural network directly acting on the graph. Based on the information propagation mechanism, each node in the graph may exchange attribute information with each other through edges, so as to continuously update its own node information until the stop condition is met.

The prediction model based on a graph neural network may be trained based on historical graph data. Correspondingly, the training sample may be historical map data, which may include the historical location information of the traffic indication device in the power-off state and the historical location information of the relevant traffic indication device. For more content on the training of prediction model based on graph neural network, refer to the relevant content of the training of prediction model, which will not be repeated here.

Some embodiments of the present disclosure may determine the congestion degree of relevant intersections based on the graph data including the traffic indication device in the power-off state, which may better reflect the correlation between various intersections, so as to improve the prediction accuracy of intersection congestion degree.

Figure 6:
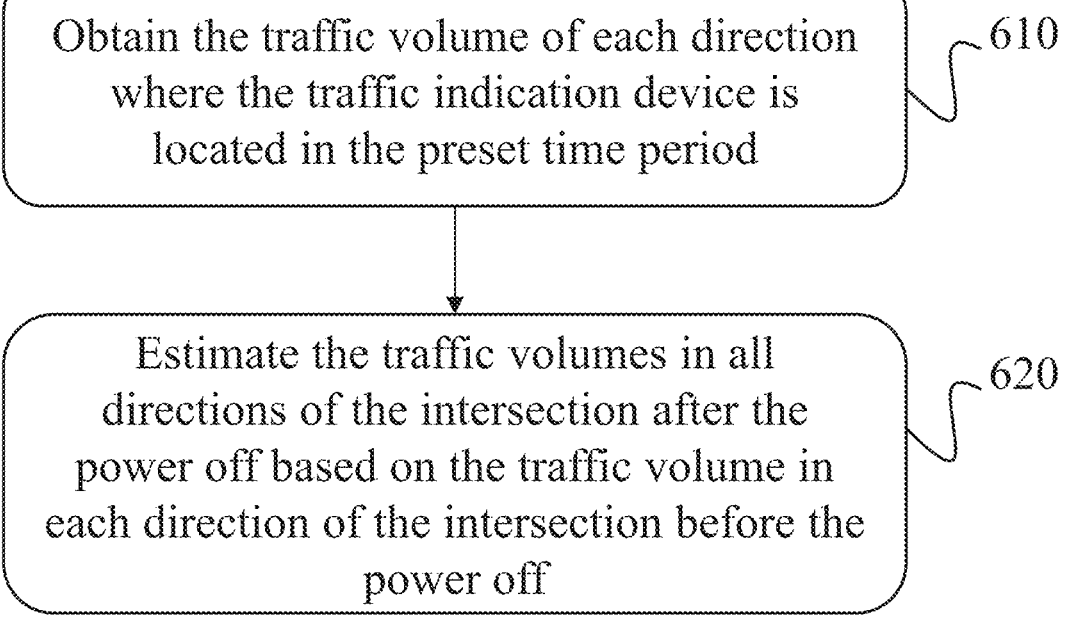
FIG. 6 is a flowchart illustrating an exemplary process for determining a count of vehicles passing through the intersection (also referred to as intersection traffic volume) according to some embodiments of the present disclosure.

FIG. 6 is a flowchart illustrating an exemplary process for determining a intersection traffic volume according to some embodiments of the present disclosure. In some embodiments, the process 600 may be performed by the traffic management platform 210. As shown in FIG. 6, the process 600 includes the following steps:

In 610, obtain the traffic volume of each direction where the traffic indication device is located in the preset time period.

Traffic volume refers to the traffic flow passing through a certain section of the road in unit time, that is, the number of vehicles passing through a certain section of the road in unit time. In some embodiments, a certain section of the road may be the location (such as zebra crossing) of each traffic indication device in the intersection. For example, the traffic volume of node E may include the number of vehicles passing through the zebra crossing position in the intersection towards to node D.

The preset time period may be a period of time before the traffic indication device is in the power-off state, for example, the preset time period may be an hour before the traffic indication device is in the power-off state. The preset time period refers to the time period when the traffic indication device is in the power supply state and the time is similar to the power-off time period. For example, when the traffic indication device is in the power-off state from 3 pm to 4 pm on a working day, the preset time period may be 3 pm to 4 pm on the previous working day of the above working day.

The traffic management platform may continuously obtain the traffic volume of the location of each traffic indication device. In some embodiments, the traffic volume may be determined by a counter, which may be installed at the counting position (at an aforementioned certain section of the road) of the road. In some embodiments, the counter may mainly consist of a detector and a counter. Among them, the detector may include a pneumatic detector, a photoelectric detector, a radar detector, an ultrasonic detector, a piezoelectric detector, and an electromagnetic detector, or the like. For example, the detector may include a piezoelectric detector arranged at the zebra crossing. When the vehicle passes, the piezoelectric detector may generate an electrical signal, and the counter may count in response to the electrical signal, so as to count the traffic volume at the intersection.

In some embodiments, the Intersection traffic volume may be determined by the imaging device. That is, the video of the intersection in the preset time period may be obtained through the camera, the video of the intersection may be recognized, and the traffic traffic volume in all directions of the intersection may be determined according to the vehicle recognition results.

In some embodiments, the monitoring video of the intersection obtained by the camera device may be processed according to the traffic volume determination model to obtain the traffic volume in all directions of the intersection. The traffic volume determination model may include at least one machine learning model. The input of the traffic volume determination model may be, for example, the monitoring video (or an image sequence of the intersection) of the intersection, and the output may be the traffic volume in all directions of the intersection.

In some embodiments, the traffic volume determination model may include a convolutional neural network (CNN) and a recurrent neural network (RNN). When the monitoring video of the intersection is input into the traffic volume determination model, the monitoring video of the intersection may be processed by the convolutional neural network to obtain the image characteristics of each video frame, and then the image characteristics of each video frame are input into the cyclic neural network, according to the image characteristics of each video frame, the traffic volume of the intersection in each direction is determined by the cyclic neural network. In some embodiments, the image characteristics of the video frame may include vehicle characteristics of the intersection in various directions in the video frame. The vehicle characteristics may include the location and image characteristics of the vehicle in the current video frames. The cyclic neural network may track each vehicle in the intersection according to the vehicle characteristics, determine the vehicle tracks, count the number of vehicle tracks in each direction of the intersection as the traffic volume of the intersection, and adjust the traffic volume of the intersection when a new vehicle track appears in the continuous frame sequence.

In some embodiments, the initial traffic volume determination model may be trained to obtain the trained traffic volume determination model. The training sample of the traffic volume determination model may be the monitoring image of the historical road, the training sample label may be the traffic volume of each intersection in the monitoring image of the historical road, and the label of the training sample may be manually marked and determined. In the training process, the samples may be input into the initial traffic volume determination model, and the model output results and sample labels may be input into the loss function. The parameter of the initial traffic volume determination model may be updated iteratively based on the loss function until the preset condition is met and the training is completed to obtain the trained traffic volume determination model. The preset condition may be that the loss function is less than the threshold, convergence, or the training cycle reaches the threshold.

In 620, estimate the traffic volumes in all directions of the intersection after power off based on the traffic volume in each direction of the intersection before the power off. In some embodiments, step 620 may be performed by the traffic management platform 210.

When the intersection is powered off, the traffic volume after power off may be reduced compared with the conventional traffic volume. In some embodiments, the reduction value of traffic volume may be estimated according to the road type. For example, the vehicle traffic volume in the preset time period before the power off may be recorded as T, the average reduction value of the traffic volume may be recorded as R, and the reduction coefficient may be recorded as a, then the vehicle traffic volume in the preset time period after the power off may be determined by an equation of $T'=T-\alpha R$, $\alpha$ is the coefficient related to the intersection type and greater than 0, R may be the preset value.

In some embodiments, the specific value of the reduction coefficient $\alpha$ may be set according to the road type. For example, when the intersection is a crossroad, the value of a may be large (for example, $\alpha=1$); If the intersection is a sidewalk access set in the road, the value of a may be small (for example, $\alpha=0.2$). In some embodiments, the average reduction value of the traffic volume R may be determined by the average reduction value of the traffic volume of the intersection after the power off in the statistical historical data.

In some embodiments, the recording time of traffic volume before power off and the power-off time may affect the estimation of traffic volume. For example, when the recording time of traffic volume before power off is 3-4 PM, and the traffic indication device is powered off at 5-7 PM, considering that the power-off time is in the evening peak period, the corresponding traffic volume is theoretically greater than the traffic volume before power off. In some embodiments, the vehicle traffic volume may be determined by the time variation coefficient $\beta$, that is, the vehicle traffic volume in a preset time period after power off may be determined by $T'=\beta T$. In some embodiments, the time variation coefficient $\beta$ may be related to the recording time of the traffic volume before power supply and the power-off time. For example, through the historical traffic volume of the intersection in each time period, after the power off, the corresponding value (such as $T_{before}$, $T_{after}$) may be determined from the historical traffic volume according to the recording time of the traffic volume before power off and the power-off time, that is, the time variation coefficient $\beta = T_{after}/T_{before}$.

In some embodiments, the foregoing determination method may be combined, for example, the vehicle traffic volume in a preset time period after power off may be determined by $T'=\beta T-\alpha R$.

According to the intersection traffic volume determination method provided in some embodiments of the present disclosure, the impact of power off on the intersection traffic volume is considered, so as to improve the accuracy of estimating the degree of intersection congestion.

FIG. 7 is a flowchart illustrating an exemplary process for determining a temporary power supply according to some embodiments of the present disclosure. In some embodiments, the process 700 may be performed by the traffic management platform 210. As shown in FIG. 7, the process 700 includes the following steps:

In 710, obtain the location information of the UAV, the location information of each traffic indication device, and the congestion degree of each traffic indication device.

A UAV may be an unmanned flying device that may perform power supply tasks, such as a multi-rotor UAV, an industrial UAV, or the like. A UAV may be equipped with an external power source. When a UAV is close to the traffic indication device in the power-off state, the external power source may be connected with the traffic indication device in the power-off state.

The location information of the UAV may include the current location of the UAV, for example, the flight location of the UAV in the route, the storage location in the storage warehouse, or the like. In some embodiments, the location information of the UAV may be determined by the positioning module set on the UAV. The positioning module may communicate with the traffic management platform 210 and send the location information of the UAV to the traffic management platform 210 in real-time or periodically.

In some embodiments, the traffic management platform 210 may obtain the location information of the UAV, the location information of each traffic indication device, and the congestion degree of each traffic indication device through the network 120. For example, the traffic management platform 210 may obtain the congestion degree of each traffic indication device determined by the processor 140 through the network 120.

In 720: determine the power supply path for the UAV to supply power to each traffic indication device based on the location information of the UAV, the location information of each traffic indication device, and the congestion degree of each traffic indication device.

The UAV may navigate based on the power supply path. During the navigation, the UAV may pass through various traffic indication devices. In some embodiments, the power supply path may be determined by a path planning algorithm, which may include a graph search method, a Rapidly-exploring random tree (RRT) algorithm, an artificial potential field method, and other algorithms.

In some embodiments, the power supply sequence may be determined according to the congestion degree of each traffic indication device, for example, the power supply sequence may be determined according to the level of congestion degree. Among them, the closer the congestion level is to level I, the higher the priority of the power supply. In some embodiments, for intersections with the same congestion level, power supply path planning may be carried out with the shortest power supply path as the planning goal.

In some embodiments, the traffic indication devices in the power-off state may be grouped according to the location information of each traffic indication device and the location information of the UAV, and the power supply path planning may be carried out for each group. Among them, each group of traffic indication devices may include traffic indication devices within a preset range.

In 730: control the UAV to supply power to each traffic indication device based on the power supply path.

The UAV may navigate based on the power supply path. When passing through the location of each traffic indication device to be powered, the external power source carried by the UAV may be placed on the traffic indication device, and the power supply circuit of the traffic indication device may be connected with the external power source so that the external power source may supply power to the traffic indication device.

In some embodiments, the UAV may also be equipped with alternative traffic indication devices. When the UAV passes through the location of each traffic indication device to be powered, the UAV may place the alternative traffic indication device in the center of the intersection where the traffic indication device to be powered is located.

According to the temporary power supply method provided in some embodiments of the present disclosure, the traffic indication device may be powered by UAV, so as to reduce the workload of staff.

The embodiment of the present disclosure also provides a computer-readable storage medium that stores computer instructions, when reading a computer instruction in the storage medium, the computer executing the method for traffic management in a smart city based on Internet of Things described in any of the foregoing embodiments.

The basic concepts have been described above, apparently, in detail, as will be described above, and do not constitute a limitation of the present disclosure. Although there is no clear explanation here, those skilled in the art may make various modifications, improvements, and corrections for the present disclosure. This type of modification, improvement, and corrections are recommended in the present disclosure, so this class is corrected, improved, and the amendment remains in the spirit and scope of the exemplary embodiment of the present disclosure.

Meanwhile, the present disclosure uses specific words to describe embodiments of the present specification. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Further, certain features, structures, or features of one or more embodiments of the present disclosure may be combined.

Moreover, unless otherwise specified in the claims, the sequence of the present disclosure, the order of the sequence of the present disclosure, the use of digital letters, or other names are not used to define the order of the present disclosure processes and methods. Although some embodiments of the invention currently considered useful have been discussed through various examples in the above disclosure, it should be understood that such details are only for the purpose of illustration, and the additional claims are not limited to the disclosed embodiments. On the contrary, the claims are intended to cover all amendments and equivalent combinations in line with the essence and scope of the embodiments of the specification. For example, although the implementation of various components described above may be embodied in a hardware device, it may also be implemented as a software-only solution, e.g., an installation on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, the present disclosure method does not mean that the features needed in the spectrum ratio of this disclosure ratio are more characteristic. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Although the numerical domains and parameters used in the present disclosure are used to confirm its range breadth, in the specific embodiment, the settings of such values are as accurate as possible within the feasible range.

For each patent, patent application, patent application publication, or other materials cited in the present disclosure, such as articles, books, specifications, publications, documents, or the like, the entire contents of which are hereby incorporated into the present disclosure as a reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflict with the content described in the present disclosure, the use of description, definition, and/or terms in this manual shall prevail.

Finally, it should be understood that the embodiments described in the present disclosure are intended to illustrate the principles of the embodiments of the present disclosure. Other deformations may also belong to the scope of this disclosure. Thus, as an example, not limited, the alternative configuration of the present disclosure embodiment can be consistent with the teachings of the present disclosure. Accordingly, the embodiments of the present disclosure are not limited to the embodiments of the present disclosure clearly described and described.

We claim:

1. A method for traffic management in a smart city based on Internet of Things (IoT), implemented in a traffic management platform, the method comprising:
    obtaining power supply detection information of a traffic indication device through a sensor network platform, comprising:
        accessing an object monitoring platform through the sensor network platform, and obtaining the power supply detection information of the traffic indication device detected by a power supply detection device from the object monitoring platform;
    predicting a congestion degree at a location of the traffic indication device in a target time period when the power supply detection information is a power-off state comprising:
        obtaining location information of the traffic indication device; and determining the congestion degree at the location of the traffic indication device in the target time period by processing, based on a prediction model, the location information, wherein
the prediction model is a Graph Neural Network (GNN) and the determining the congestion degree at the location of the traffic indication device in the target time period by processing, based on a prediction model, the location information, comprising:
processing graph data based on the prediction model to determine a predicted value of the congestion degree of at least one node in the graph data in the target time period; wherein the graph data include a plurality of nodes and a plurality of edges/paths connecting a plurality of nodes, characteristics of the at least one node include a count of vehicles passing through an intersection, and characteristics of the plurality of edges include intersections at both ends of road, road direction, and road length;
processing a monitoring video of the intersection obtained by a camera device based on a traffic volume determination model to obtain a traffic volume in all directions of the intersection, wherein the traffic volume determination model includes a convolutional neural network (CNN) and a recurrent neural network (RNN);
processing the monitoring video of the intersection based on the CNN to obtain image characteristics of each video frame when the monitoring video of the intersection is input into the traffic volume determination model;
inputting the image characteristics of each video frame into the RNN; and
determining the traffic volume of the intersection based on the image characteristics of each video frame in each direction through the RNN; and
determining whether a temporary power supply is needed to be provided to the traffic indication device based on the congestion degree.

2. The method according to claim 1, wherein a manner of the temporary power supply includes supplying power to the traffic indication device through a battery carried by an unmanned aerial vehicle (UAV).

3. A system for traffic management in a smart city based on Internet of Things (I), comprising a traffic management platform, a sensor network platform, and an object monitoring platform, wherein the traffic management platform is configured to perform the following operations including:
obtaining power supply detection information of a traffic indication device through a sensor network platform; comprising:
accessing an object monitoring platform through the sensor network platform, and obtaining the power supply detection information of the traffic indication device detected by a power supply detection device from the object monitoring platform;
predicting a congestion degree at a location of the traffic indication device in a target time period when the power supply detection information is a power-off state, comprising:
obtaining location information of the traffic indication device; and
determining the congestion degree at the location of the traffic indication device in the target time period by processing, based on a prediction model, the location information, wherein
the prediction model is a Graph Neural Network (GNN) and the determining the congestion degree at the location of the traffic indication device in the target time period by processing, based on a prediction model, the location information, comprising:
processing graph data based on the prediction model to determine a predicted value of the congestion degree of at least one node in the graph data in the target time period; wherein the graph data include a plurality of nodes and a plurality of edges/paths connecting a plurality of nodes, characteristics of the at least one node include a count of vehicles passing through an intersection, and characteristics of the plurality of edges include intersections at both ends of road, road direction, and road length;
processing a monitoring video of the intersection obtained by a camera device based on a traffic volume determination model to obtain a traffic volume in all directions of the intersection, wherein the traffic volume determination model includes a convolutional neural network (CNN) and a recurrent neural network (RNN);
processing the monitoring video of the intersection based on the CNN to obtain image characteristics of each video frame when the monitoring video of the intersection is input into the traffic volume determination model;
inputting the image characteristics of each video frame into the RNN; and
determining the traffic volume of the intersection based on the image characteristics of each video frame in each direction through the RNN; and
determining whether a temporary power supply is needed to be provided to the traffic indication device based on the congestion degree.

4. The system according to claim 3, wherein a manner of the temporary power supply method includes supplying power to the traffic indication device through a battery carried by an unmanned aerial vehicle (UAV).

5. A non-transitory computer-readable storage medium that stores computer instructions, when reading the computer instructions in the storage medium, the computer executing the method according to claim 1.

\* \* \* \* \*